United States Patent
Pakriswamy (10) Patent No.: US 6,198,335 B1
(45) Date of Patent: Mar. 6, 2001

(54) METHOD AND APPARATUS TO DRIVE THE COIL OF A MAGNETIC WRITE HEAD

(75) Inventor: Elango Pakriswamy, Santa Clara, CA (US)

(73) Assignee: STMicroelectronics, Inc., Carrollton, TX (US)

(*) Notice: Subject to any disclaimer, the term of this patent is extended or adjusted under 35 U.S.C. 154(b) by 0 days.

(21) Appl. No.: 09/258,100

(22) Filed: Feb. 25, 1999

(51) Int. Cl.[7] ................................................. H03K 17/56
(52) U.S. Cl. ........................... 327/423; 327/424; 327/110
(58) Field of Search ..................................... 327/110, 423, 327/424, 427, 568, 487, 588, 494, 390, 589

(56) References Cited

U.S. PATENT DOCUMENTS

| | | | |
|---|---|---|---|
| 5,309,347 | * 5/1994 | Poma et al. | 327/423 |
| 5,521,547 | * 5/1996 | Tsukada | 327/589 |
| 5,834,965 | * 10/1998 | LeClerc | 327/423 |
| 5,952,856 | * 9/1999 | Horiguchi | 327/110 |
| 5,990,640 | * 11/1999 | Dwyer et al. | 318/254 |
| 6,011,423 | * 1/2000 | Baizley et al. | 327/423 |

OTHER PUBLICATIONS

"Gain of 1 for 5–Volt Read/Write Preamplifiers," VTC Inc., p. 7–5, Aug. 1994.

\* cited by examiner

*Primary Examiner*—Kenneth B. Wells
*Assistant Examiner*—Paul Dinh
(74) *Attorney, Agent, or Firm*—Theodore E. Galanthay; Lisa Jorgenson; David V. Carlson (57) ABSTRACT

A circuit and method to drive an H-bridge circuit are disclosed. The H-bridge circuit uses NMOS transistors for both the upper and lower sets of transistors. An inductive head is coupled between the terminals of the transistors. When a logic signal is received, one of the upper transistors is driven. The upper transistor selected to be driven is responsive to the logic signal. A corresponding lower transistor is also driven, forcing current through the inductive head in a first direction. The driving circuit for the lower transistors includes a programmable circuit structured to capacitively couple the output of the driving circuit to a pull-up voltage, thereby allowing the amount of current forced through the inductive head to be maximized for optimum data transfer. Within the programmable voltage boost circuit are several logic gates, each coupled to a capacitor of differing value. When the circuit is manufactured, the inductive head is tested to determine the capacitance value to be coupled to the lower driving transistors for improved operation. Codes are stored on the chip that identify the corresponding logic gate or gates to obtain the selected capacitance. The selected logic gates are enabled when the H-bridge circuit is operational. The boosted driving circuits are used to quickly change the direction of the flux through the inductive head.

23 Claims, 5 Drawing Sheets

| 236 output | 226 output | 216 output | total pull-up capacitance |
|---|---|---|---|
| 0 | 0 | 0 | 0 |
| 0 | 0 | 1 | 2 pF |
| 0 | 1 | 0 | 4 pF |
| 0 | 1 | 1 | 6 pF |
| 1 | 0 | 0 | 8 pF |
| 1 | 0 | 1 | 10 pF |
| 1 | 1 | 0 | 12 pF |
| 1 | 1 | 1 | 14 pF |

Fig. 2C

| $b_x{}^*$ | data | NOR gate output | inverter output |
|---|---|---|---|
| 0 | 0 | 1 | 0 |
| 0 | 1 | 0 | 1 |
| 1 | 0 | 0 | 1 |
| 1 | 1 | 0 | 1 |

METHOD AND APPARATUS TO DRIVE THE COIL OF A MAGNETIC WRITE HEAD

CROSS-REFERENCE TO RELATED APPLICATION

This application is related to copending patent application, filed on the same date herewith, Application Ser. No. 09/258,081.

TECHNICAL FIELD

This invention relates to circuits for driving inductive loads and more particularly to a bridge circuit for driving the inductive coil of a magnetic write bead of a disk drive.

BACKGROUND OF THE INVENTION

Most computer systems include one or more associated disk drives, which may be built into or external to the computer system. Typically, disk drives have at least one rotating magnetic medium and associated head mechanisms that are carried adjacent the magnetic material. The heads are radially positionable to selectively write information to, or read information from, precise positions on the disk medium. Such disk drives may be, for example, hard disk drives, floppy drives, or the like.

Data is written to the associated data disk by applying a series of signals to a write head according to the digital information to be stored on the magnetic disk media. The write head has a coil and one or more associated pole pieces that are located in close proximity to the disk media. As signals cause the magnetic flux to change in the head, the magnetic domains of the magnetic media of the disk are aligned in predetermined directions for subsequent read operations. Typically, a small space of unaligned magnetic media separates each magnetic domain transition to enable successive transitions on the magnetic media to be distinguished from each other.

Since the disk is moving relative to the head, it can be seen that if the small space separating the magnetic domain transitions is not sufficiently wide, difficulty may be encountered in distinguishing successive magnetic transitions. This may result in errors in reading the data contained on the disk, which is, of course, undesirable.

Meanwhile, as computers are becoming faster, it is becoming increasingly important to increase the speed at which data can be written to and read from the disk media. However, since the data signals are in the form of square wave transitions, if the rise time of the leading edges of the square waves is large, the small space between magnetic media transitions also becomes large, which reduces the effective rate at which data can be accurately written and read. Since the write head assembly includes at least one coil, forcing the current to rise rapidly, or to reverse flux directions within the write head is difficult.

In the past, data writing circuits used to supply such write signals to the heads included preamplifier circuits to drive the current through selected legs of an "H-bridge" circuit, which is capable of allowing relatively fast current reversals for accurate data reproduction.

As mentioned above, as data rates increase, the rates at which the heads can accurately write the data to the magnetic media is limited by the speed at which the flux in the inductive coil of a write head (and its associated components) can be reversed. The maximum data rate is thus limited to the maximum physical flux reversal rate of the driver circuitry.

What is needed, therefore, is a method and circuit for driving an inductive load of the type used in conjunction with a write head of a disk drive with a signal that enables a maximum flux reversal rate in the driver coil.

SUMMARY OF THE INVENTION

According to one advantage of the invention, a programmable voltage boost circuit for use with an H-bridge circuit is provided. Two transistors are coupled to two respective nodes having an inductive element in between them, and all four transistors are driven by driver circuits. Coupled to one or more of the driver circuits is the programmable voltage boost circuit that has several logic gates, each independently enabled. Attached to the logic gates are capacitors that are connected to the boost circuit output. If the logic gates are enabled, they pull the output toward a pull-up voltage using the selected pull-up capacitors. In one embodiment of the invention, the capacitors have different values and the values are chosen to be binary weighted.

According to another aspect of the present invention, a method of providing a voltage boost to a circuit that drives a transistor in an H-bridge circuit and that has data and program signal inputs begins with providing enabling signals to the voltage boost circuit. Then the voltage boost circuit uses the enabling signals to selectively enable one or more logic gates within the voltage boost circuit and capacitively couples the output of the voltage boost circuit to a pull-up voltage when a valid data signal is received by an enabled logic gate

DETAILED DESCRIPTION OF THE INVENTION

Figure 1:
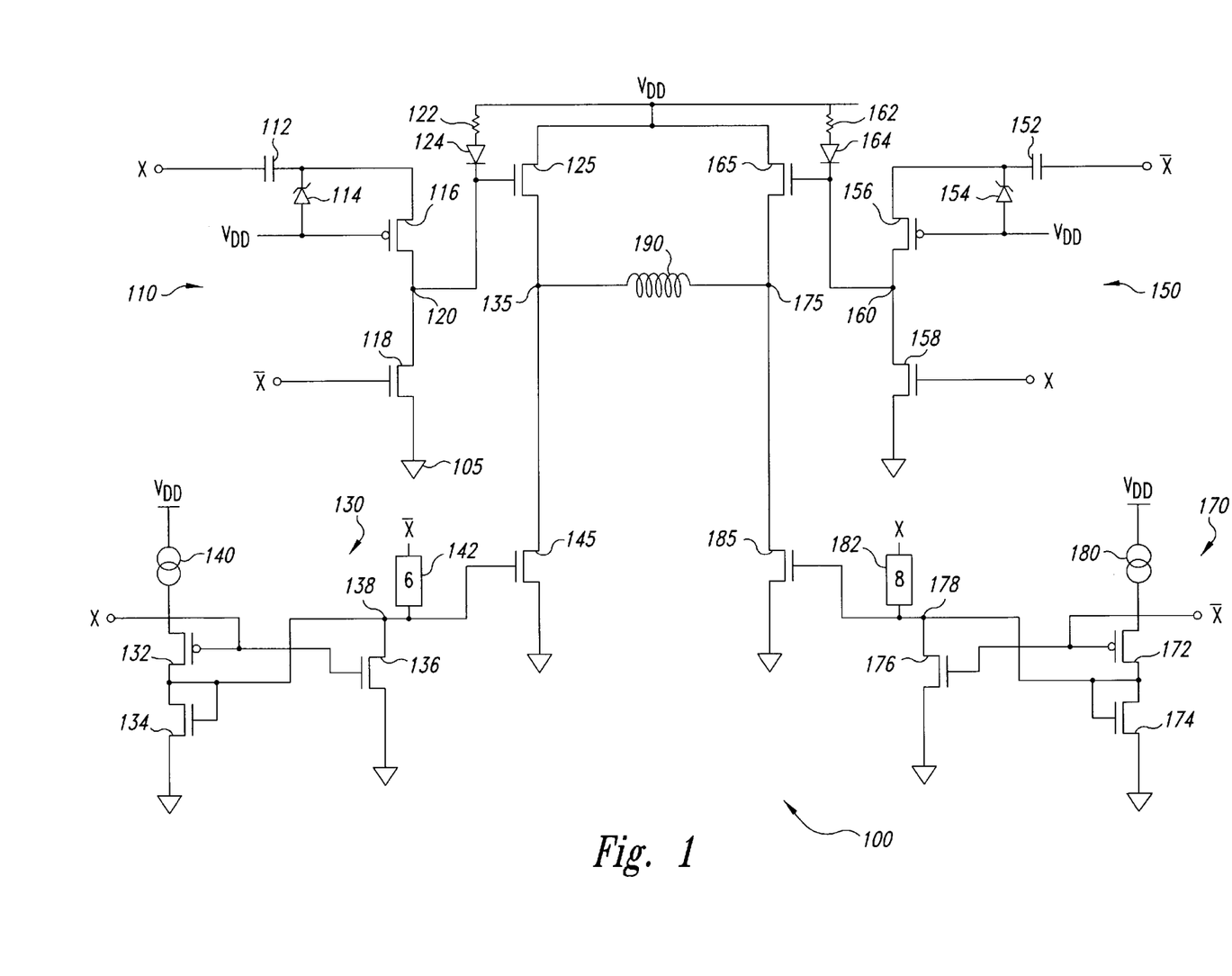
FIG. 1 is a schematic diagram of an H-bridge circuit for driving a coil of a magnetic write head.

An example of a bridge circuit 100, of the type similar to that described in co-pending patent application, Ser. no. 09/258,081, filed on the same date herewith, incorporated herein by reference, for providing write signals to a magnetic write head assembly, is shown in FIG. 1. FIG. 1 shows a bridge circuit 100 used to drive a coil 190 in a magnetic write head. Although the coil 190 is shown as an inductor, those skilled in the art will recognize hat the coil behaves in a manner unlike an ideal inductor. This behavior is caused by such effects as, e.g., parasitic capacitance of coil driving transistors, resistance effects in the coil 190 and other components of the bridge circuit 100, and various other factors. It is also recognized that the bridge circuit 100, although described in this embodiment with reference to an inductive coil 190 for use in a magnetic write head, can be used to drive other components properly situated within the circuit 100, such as windings of a drive motor, an alternator used as a braking mechanism, or other compatible devices. The invention is not limited to the embodiment described herein nor the examples listed above, and is intended to be broad in scope.

The coil 190 is driven by four bridge transistors including two upper transistors, 125 and 165, and two lower transistors, 145 and 185. The bridge circuit 100 is configured such that the upper transistor 125 and lower transistor 185 are both on hard when magnetic flux of a first direction is to be written by the coil 190 to the disk media. As seen in FIG. 1, this causes the current flow from left to right across the coil 190. Conversely, when magnetic flux of a second direction is to be written to the disk media, the bridge circuit 100 turns on the upper transistor 165 and the lower transistor 145, thereby forcing the current from right to left across the coil 190. The upper transistors 125, 165 essentially serve as switching transistors, while the lower transistors 145, 185 serve as current control transistors dictating the magnitude of the current that flows through the coil 190. The individual driving circuits that drive the upper transistors 125, 165 and the lower transistors 145 and 185 are described below.

A driving circuit 110 drives the upper transistor 125. A data signal X is coupled to one plate of a capacitor 112 and a data complement $\overline{X}$ is coupled to a gate of a transistor 118. A node 120 separates the transistor 118 from a transistor 116. The gate of the transistor 116 is coupled to a $V_{DD}$ voltage of, for example, 8 volts. The $V_{DD}$ voltage is also coupled to an anode of a diode 114, the cathode of which is coupled to a second plate of the capacitor 112 and to a source of the transistor 116.

In operation, the anode of the diode 114 is coupled to the constant $V_{DD}$ voltage. Therefore, in a steady state, the plate of the capacitor 112 coupled to the cathode of the diode 114 is charged to a voltage of $V_{DD}$ minus the diode threshold voltage, typically around 0.7 volts. Therefore, if the $V_{DD}$ voltage is 8 volts, the second plate of the capacitor 112 charges to about 7.3 volts in the steady state.

Assume X, in its steady state, has a value of 0 and is changing to 5 volts. This occurs when magnetic flux of the first direction is to be written by the coil 190. In the steady state, the second plate of the capacitor 112 rests at 7.3 volts. When X changes from 0 volts to 5 volts, the capacitor 112 maintains the same voltage differential between the plates as it had previously, ie., 7.3 volts. Therefore, at the same time X changes from 0 to 5 volts, the second plate of the capacitor 112 escalates to approximately 12.3 volts. This voltage differential causes the transistor 116 to turn on and a voltage near 12 volts becomes present at the node 120. When X changes from 0 volts to 5 volts, $\overline{X}$ changes from 5 volts to 0 volts, turning the transistor 118 off, thereby isolating the node 120 from a reference voltage 105.

A resistor 122 and diode 124 are coupled between the $V_{DD}$ voltage and the gate to the transistor 125. These components replenish any current leaking through the driving circuit 110 and thus keep the gate of transistor 125 above the $V_{DD}$ voltage less a diode drop voltage during the entire time the data signal X is at 5 volts.

The driving circuit 150 is similar in configuration to the driving circuit 110, however, the signals are complemented. Thus, when one of the driving circuits 110, 150 is on, the other is off, and vice versa.

The lower transistors 145 and 185 are also controlled by a symmetrical pair of driving circuits 130 and 170. Similar to the driving circuits described above, the driving circuit 130 is driven by data signals that are complementary to the driving circuit 170, so that one of the driving circuits 130, 170 is on while the other is off, and vice versa.

In the driving circuit 130, a current source 140 is coupled in series to a transistor 132 and to a diode-connected transistor 134. The data signal X drives a gate of the transistor 132 as well as a gate of a transistor 136. The drain of the transistor 136 is coupled to a node 138, which couples the drain and gate of the diode-connected transistor 134 with a transistor 145 and a pull-up circuit 6 including a capacitor 142. The pull-up circuit 6 is driven by the data signal $\overline{X}$.

In operation, when the data signal X goes from 0 to 5 volts, the transistor 136 turns on, pulling node 138 to ground. Because the data signal X is at 5 volts, the transistor 132 stays off. Additionally, any charge accumulated on the capacitor 142 is pulled to ground through the transistor 136. Therefore, when X changes from 0 to 5 volts, the lower transistor 145 is off.

As the data signal X is changing from 0 to 5 volts, the data signal $\overline{X}$ is changing from 5 volts to 0 volts. The driving circuit 170 that drives the gate of the lower transistor 185 is nearly identical to the driving circuit 130. However, it is driven by opposite signals. Specifically, it is the $\overline{X}$ data signal that drives the gates of transistors 176 and 172 and the data signal X that is coupled to a pull-up circuit 8. The node 178 couples the source of the transistor 172, the drain and gate of the transistor 174, the drain of the transistor 176, the pull-up circuit 8, and the gate for the transistor 15 185.

When the data complement $\overline{X}$ changes from 5 volts to 0 volts, the transistor 176 turns off, thus isolating the node 178 from the ground voltage. The transistor 172 begins conducting, and current flows from a current generator 180. The generated current that flows through the transistor 172 and the diode-connected transistor 174. As the data signal X goes from 0 volts to 5 volts, the pull-up circuit 8 brings up the voltage at the node 178. This causes the transistor 185 to turn on hard.

As described above, when the data signal X changes from 0 volts to 5 volts, the upper transistor 125 and lower transistor 185 are both on hard. Thus, current flows through the transistor 125, across the transistor 190 from left to right and through the lower transistor 185 to ground. The other transistors, 145 and 165 are both off during this time. When the data signal X changes from 5 volts to 0 volts, the reverse is true. That is, the upper transistor 165 turns on, allowing current to flow from right to left through the coil 190 and through the transistor 145 to ground.

Overshoot is a condition where greater than normal current is provided to the coil of an H-bridge circuit at the beginning of a data transmission to initiate a quick flux reversal in the coil. This allows the magnetic field surrounding the coil to switch directions faster than in a typical H-bridge circuit. Since the flux can reverse faster in coil having overshoot, a greater amount of data can be written to the recording media than with a conventional H-bridge circuit. Too much overshoot can be detrimental, however, because the excess current can overwrite data intended to be written to the recording media. Thus it is desirable to have an H-bridge circuit with a "programmable" overshoot, in order to exactly control the amount of current flowing through the coil at a time.

Figure 2A:
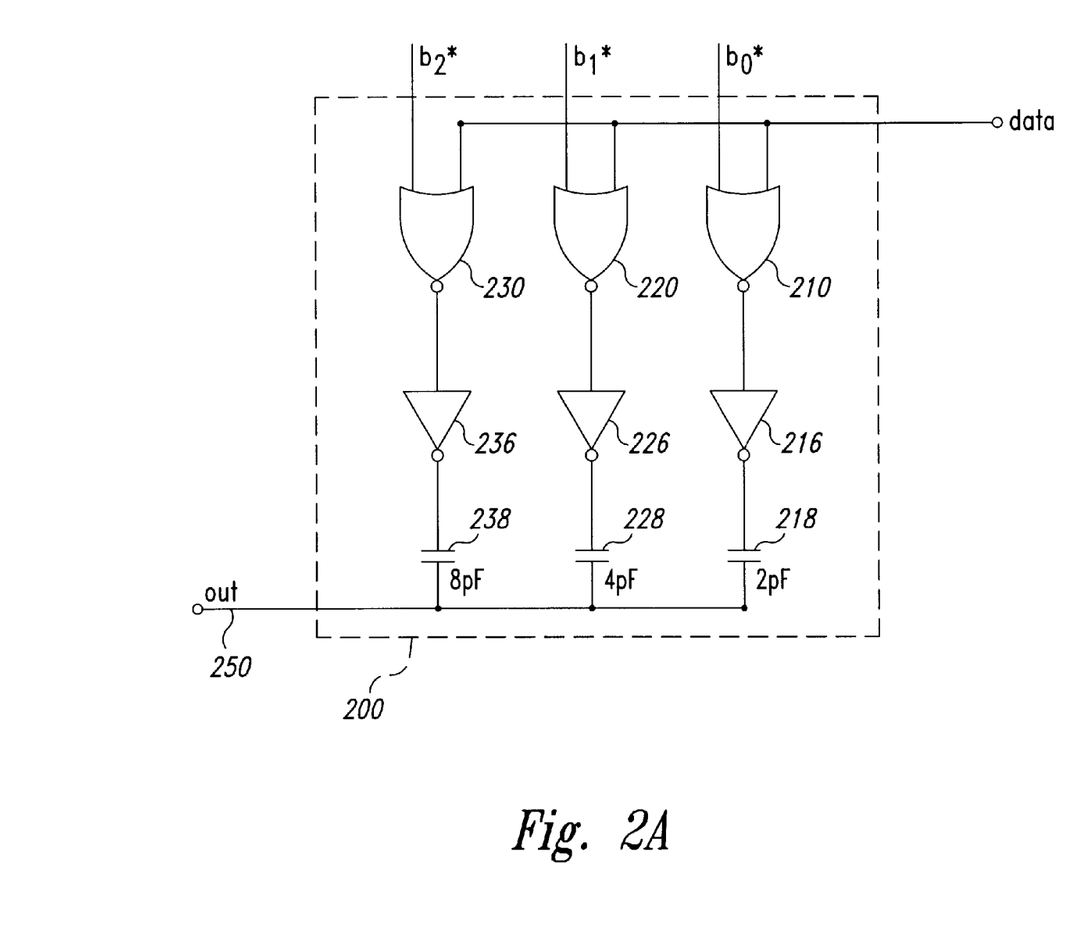
FIG. 2A is a schematic diagram of a programmable circuit used in the H-bridge circuit shown in FIG. 1.

FIG. 2A shows a programmable circuit 200 that can be used as the pull-up circuits 6 and 8 of FIG. 1. Included in the programmable circuit 200 are three NOR gates, 210, 220 and 230. Of course, a greater or fewer number of gates could be used, the number of gates being determined by, among other factors, the amount of pull-up boost needed and the granularity of the boost, as later discussed. Each of the NOR gates 210, 220, and 230 has a pair of inputs, one for a respective programming signal, b0*, b1 *, b2*, and one for a data signal common to all of the NOR gates within the programmable circuit 200. The output from the NOR gate 210 is coupled to an inverter 216, the output of which is coupled to a capacitor 218. Similarly, the output from the NOR gate 220 is coupled to an inverter 226 which has its output coupled to a capacitor 228, and the output of the NOR gate 230 is coupled to an inverter 236 which has its output coupled to a capacitor 238. An OR gate could be used instead of a NOR gate followed by an inverter, however, in a preferred embodiment, the size of the transistors making the inverter are chosen to be large enough to drive the coupled capacitor.

A pull-up voltage, such as 5 volts, placed on a first one of the plates of a capacitor will tend to pull the second plate of the capacitor to a voltage near that of the first plate. The rate at which the voltage of the second plate tends toward the voltage of the first plate is a function of the capacitance value of the capacitor, among other factors.

In FIG. 2A, a pull-up voltage output from any of the inverters will tend to pull up an output 250 of the programming circuit 200 toward the pull-up voltage of the inverter, for example, 5 volts. The rate at which the output 250 is pulled up toward 5 volts is related to the total capacitance of the capacitors 218, 228 and 238 that are coupled to the 5 volt source, as well as other factors. As discussed below, the signals b0*, b1*, and b2* are selected to couple at least one, and as many as all of the capacitors 218, 228, and 238 to the output 250. Higher values of total capacitance coupled to the output 250 will allow it to be pulled up toward the pull-up voltage faster than if lesser capacitance is applied. In order to allow the greatest flexibility, the capacitance values for the capacitors 218, 228, and 238 are binary weighted, so that the capacitor 228 has twice as much capacitance as the capacitor 218, and has one-half the capacitance as the capacitor 238.

Figure 2B:
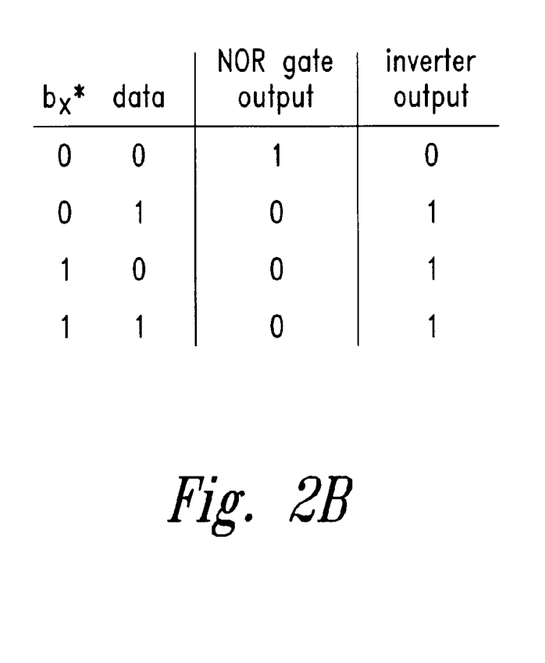
FIGS. 2B and 2C are charts indicating different outputs of the programmable circuit of FIG. 2A.

FIG. 2B is a chart showing the output of one of the NOR gates, for instance the NOR gate 210, and its corresponding inverter 216. The chart shows that when the b0* input to the NOR gate is 1, the NOR gate output is always 0, and the inverter output signal is always 1, no matter what value the data input has. Therefore, the signal b0* must be 0 to enable the NOR gate. When the signal b0* is at 0, the output of the NOR gate is determined solely by the state of the data signal. When enabled by b0*, the output of the NOR gate is 1 when the data signal is 0 and the output is 1 when the data signal is 0. Correspondingly, when the output of the NOR gate is 0, the inverter output is 1, and when the output of the NOR gate is 1, the inverter output is 0.

Therefore, if an additional pull-up voltage is required at the output 250, the NOR gates 210, 220, and 230 are selectively enabled to capacitively couple the output 250 to a pull-up voltage so that when the data signal goes from 0 volts to 5 volts, the output 250 is pulled up toward the pull-up voltage volts at the desired rate.

Figure 2C:
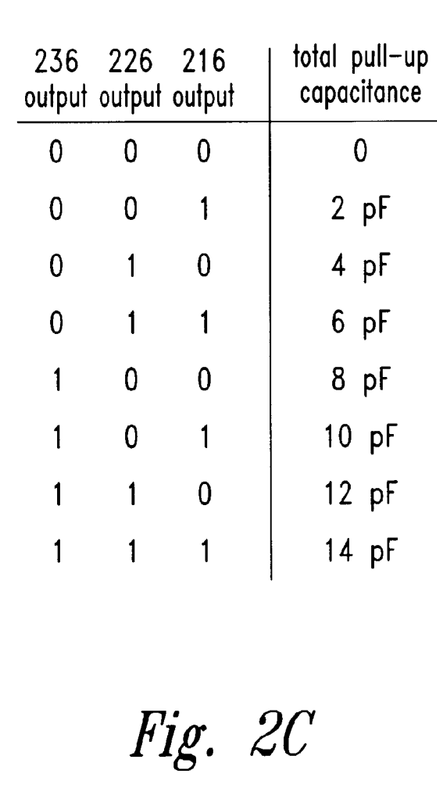

FIG. 2C is a chart showing the total capacitance coupled between the output 250 and the pull-up voltage, depending on which of the NOR gates are enabled. Shown in FIG. 2C are eight different possibilities of the output from the inverters 216, 216 and 226 as well as the total capacitance coupled to the output 250. In this example, the capacitor 218 has a value of 2pF, the capacitor 228, 4pF and the capacitor 238, 8pF. Although other capacitance values are possible, in a preferred embodiment it is desirable to keep the capacitors in a binary-weighted relationship.

If no NOR gates are enabled, there is no selected capacitance coupled to the output 250. Of course, there will be some parasitic capacitive coupling in the transistors making up the NOR gates, but no purposefully applied capacitance would be coupled to the output 250. In the bridge circuit 100 shown in FIG. 1, some additional capacitance in the pull-up circuit 6 is necessary for proper circuit operation.

Referring back to FIG. 2C, eight possibilities of combinations of total capacitance are shown. When none of the inverters 216, 226, 236 produce a pull-up voltage, no pull-up capacitance is coupled to the output 250. When one or more of the inverters 216, 226, 236 are coupled to a pull-up voltage, at least 2pF of capacitance and as much as 14pF of capacitance is coupled between the output 250 and the pull-up voltage. For instance, when the output of the inverter 216 is pulled toward 5 volts, the output 250 is coupled to the pull-up voltage through a capacitor having a value of 2pF. If both the output of inverters 236 and 216 are coupled to a pull-up voltage, then 10pF of capacitance would be coupled to the output 250. By having the capacitors 218, 228 and 238 related to one another by a power of two, a smooth progression between the minimum value and maximum value is possible for greater ease of programming the programmable circuit 200 for optimum bridge circuit 100 operation.

The operation of the bridge circuit 100 including the programmable circuit 200 in place of both the pull-up circuits 6 and 8 will be described with reference to FIGS. 1 and 2. When the bridge circuit 100 switches direction, as described above, one of the lower transistors 145 or 185 must quickly turn on. In order to quickly turn on an NMOS transistor, a gate voltage that is higher than the threshold voltage is applied. Without a pull-up circuit such as 6 and 8 shown in FIG. 1 or the programmable circuit 200 shown in FIG. 2A, the lower transistor 145 or 185 would not turn on quickly enough for proper circuit operation. By substituting the programmable circuit 200 for the pull-up circuits 6 and 8, flexibility is given to the disk drive manufacturer to choose the optimum current that flows through the right head 190.

With reference to the driving circuit 170 of FIG. 1, assume that X is 0 and $\overline{X}$ is 1. The transistor 176 will be on, coupling the node 178 to ground, and discharging the capacitors 218, 228, and 238 shown in FIG. 2. Because X is 0, the output of all the inverters 216, 226 and 236 is also 0.

When the data signal X changes from 0 volts to 5 volts, $\overline{X}$ changes from 5 volts to 0 volts. At this time, the intention is to drive the gate of the lower transistor 185 with a high gate voltage as soon as possible. Therefore, assume that b0*, b1*, and b2* all have a 0 input, thus enabling the NOR gates 210, 220 and 230. As the data signal $\overline{X}$ changes from 5 volts to 0 volts, the transistor 176 begins to turn off while the transistor 172 begins to turn on. The current source 180 supplies a low current value selected to keep the current flow at a low value and achieve the desired voltage at node 178. Once the transistor 172 turns on high enough, the diode-connected transistor 174 will begin to turn on as well. Since the transistor 176 is no longer on, the node begins to float.

Since the NOR gates 210, 220, and 230 are enabled, as the data signal X changes from 0 to 5 volts, the output of each of the inverters 216, 226, and 236 also changes towards a high value. The output of the inverters is applied to the first plate of each of the transistors 218, 228 and 238, the second plate of which is coupled to the output 250, which in this example is also node 178.

For a brief transient, the pull-up voltage begins pulling the second plate of the capacitors towards a high value. The capacitors 218, 228 and 238 appear as a short circuit. The voltage on the first plate is transferred immediately to the second plate. Thus, for this transient signal, seen by the capacitor as a high frequency signal, the value on the output line 250 and thus node 178 follows the output of the enabled inverters 216, 226, 236. As the node 178 is pulled towards a high value, the gate of 185 goes high, turning on transistor 185. The transistor 185 thus receives a high value transient pulse as a turn-on signal. In a preferred embodiment, the output of the inverters 216, etc. go towards five volts. It can, of course be selected to go to desired voltage, such as 8 volts, 3 volts, etc., at a desired rate.

Once the node 178 has been pulled high, however, a secondary factor takes over and the voltage on node 178 is reduced. The transient effect is reduced at a rate determined by the value of the capacitors enabled by the NOR gates 210, 220, 230. For a longer affect, higher capacitor values are enabled, for a shorter affect, only a low, for example only NOR gate 210 for capacitor 218, is enabled. Thus, the high voltage transient signal from boost circuit 182 is reduced as a programmable rate, depending on the selection of which gates are enabled. This secondary factor is the diode-coupled transistor 174, which operates as a voltage divider with the transistor 172. Eventually, the diode-coupled transistor 174 will pull the node 178 down toward a static voltage of a value based on the threshold of 174 and 172 and currents from 180. Usually it will be midrange voltage of, for instance, slightly over 2 volts.

In a preferred embodiment, the programmable circuit 200 enables the voltage applied to the gate of the transistor 185 to begin at 0, progress toward 5 volts and reach between 3½–4½ volts before it begins to be pulled down to the stable 2.2 volts as set by the divider circuit of transistors 174 and 172. This programmable circuit 200, not only allows the voltage on the gate of the transistor 185 to come up faster than it would have had the programmable circuit 200 not been present, it also holds this gate voltage on the gate of the transistor 185 for a time before being drained. As described above, by enabling various of the NOR gates 210, 220, 230, the maximum pull-up voltage as well as the rate at which the pull-up voltage is drained away is selectable by the disk drive manufacturer.

Figure 3:
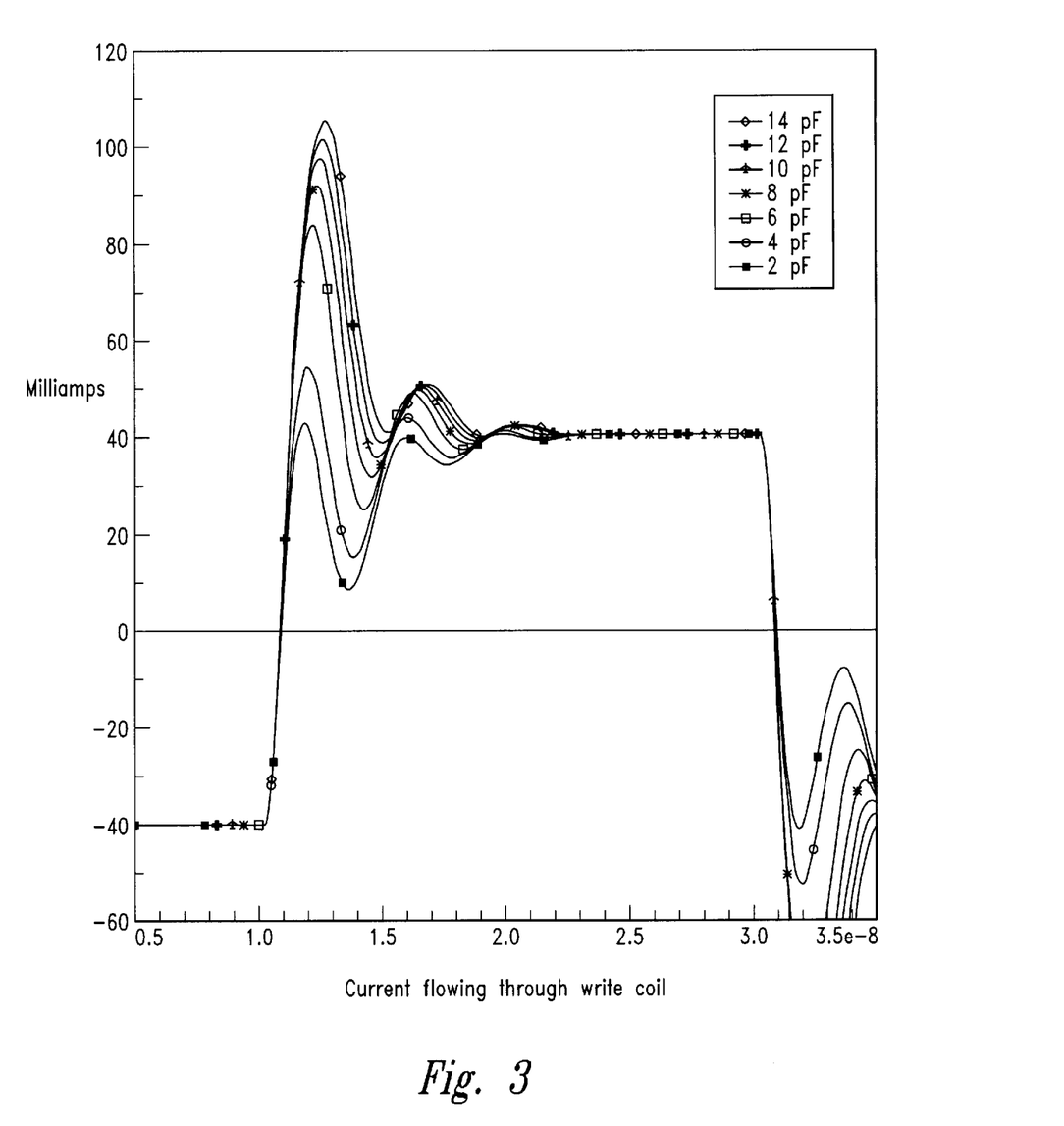
FIG. 3 is a graph showing a simulated output of an embodiment of the present invention.

FIG. 3 shows simulation results from the embodiment of the invention described with respect to FIGS. 1 and 2. The graph shows current flowing through the coil 190, in milli-amps during the time data is to be written to the magnetic media. In FIG. 3, seven separate waveforms are shown, corresponding to the seven allowable program settings of the programmable circuit 200 shown in FIG. 2C. Since the bridge circuit 100 will not work unless external capacitance is applied to the output 250 of the programmable circuit 200, the waveform where no capacitance is added has been omitted in the graph. The other seven possibilities are shown in FIG. 3.

The capacitance values for the waveforms shown on FIG. 3 maintain a logical progression. The waveform showing the lowest peak current (41 mA) is the condition where only 2pF is provided to the output 250 of the programmable circuit 200. Since the output 250 is directly coupled to one of the lower transistors 145 or 185 (FIG. 1), having the low capacitance value means it cannot turn the respective transistor on very hard and consequently little peak current flows through the coil 190. The waveform showing the highest peak current (112 mA) is the condition where all of the NOR gates 210, 220, and 230 are enabled, coupling 4pF to the output 250. This causes the output 250 to pull up hard when the data input of the programmable circuit 200 transitions to 1, thus turning on the respective lower transistor 145, 185 and sending a high peak current through the coil 190.

The coil 190 does not behave as a pure inductor, however, but more like an RC circuit, due to the parasitic capacitance of the upper transistors 125, 165 and the lower transistors 145 and 185. This causes the current sent through the coil 190 to oscillate before it eventually becomes fixed. The value to which it finally fixes is unrelated to the additional capacitance added to bridge circuit 100 by the programmable circuit 200, as proven by all of the waveforms in FIG. 3 settling at the same final value. Instead, as discussed above, this stable voltage value is determined by the resistance of the diode-coupled transistors 134 and 174.

During the later stages of manufacturing a disk that includes the programmable circuit 200, the disk drive is tested with various total capacitance values until an optimum value is determined. Then the proper codes that cause programming signals to be generated are permanently stored in a non-volatile memory, such as an EPROM or EEPROM. When the disk drive is turned on, these signals are fed to the programmable circuit 200, which enables one or more of the NOR gates. In a preferred embodiment, the programmable circuit 200 is programmed at the time a disk drive is initialized, usually when it is first powered, according to set parameters determined at manufacture. The optimum value of applied capacitance to the output 250 of the programmable circuit 200 may change as the disk drive 400 ages. By including a diagnostic program to be run on a computer to which the disk drive containing the programmable circuit 200 is attached, this optimum capacitance value can be updated throughout the life of the disk drive. For instance, the program may direct circuitry within the disk drive to measure the output of the write coil 190. A new optimum capacitance value can be selected and restored to the non-volatile memory. This diagnostic program could be run as often as the operator chooses. Greater detail of the programming the programmable circuit 200 is provided with the description accompanying FIG. 4.

Figure 4:
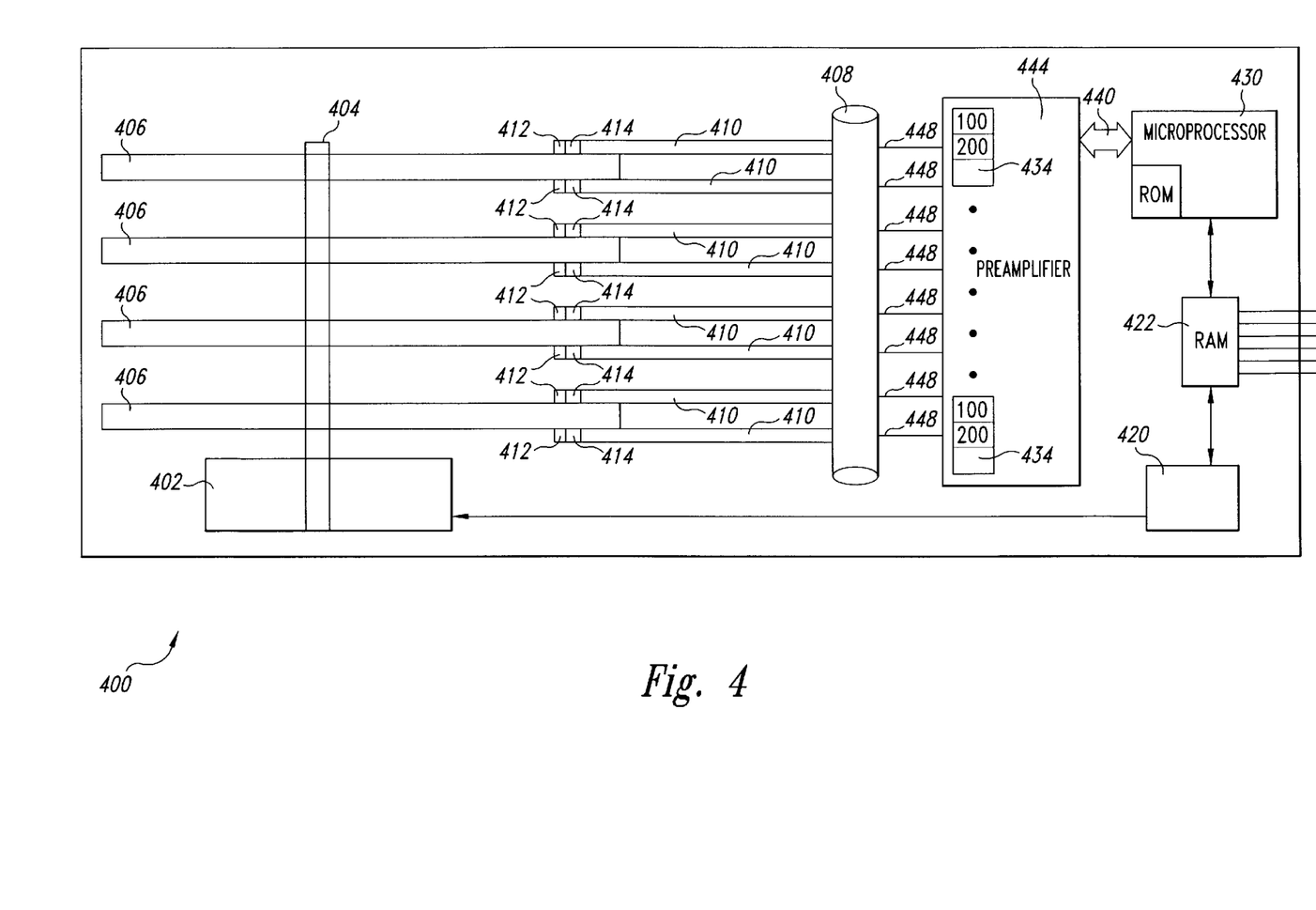
FIG. 4 is a functional diagram of a disk drive that contains an embodiment of the present invention.

FIG. 4 is a diagram of a disk drive that can be used to store data in, for instance, a computer (not shown). The drive 400 includes a motor 402 for rotating a spindle 404 which in turn rotates platters of storage media 406. Although four platters 406 are shown in FIG. 4, more or fewer platters could be used as is known in the art a motor controller 420 receives signals from a RAM interface 422 and uses those signals to control the motor 402.

The drive 400 also contains an actuator 408 that provides support for a number of support arms 410. The number of support arms 410 will generally be twice the number of platters 406 contained in the disk drive 400, although more or fewer support arms 410 could be used. At the end of each support arm 410 is a write head 412 used to write data to a respective platter 406 and a read head 414 used to read data from the platter. As is known in the art, the write head 412 and read head 414 may be embodied in one read/write head (not shown). Generally, the platters 406 have a magnetic storage medium on both sides, thus one read head 412 and one write head 414 will be positioned near each side of every platter 406. In operation, the heads 412, 414 float on a cushion of air very close to the spinning platters 406.

Within the disk drive 400 is a microprocessor 430 including ROM memory. The microprocessor 430 receives signals from the RAM interface unit 422. The interface unit 422 receives control and data signals from the computer system (not shown). The interface unit 422 is typically coupled to the computer system via a bus such as a PCI or SCSI bus (not shown), as is well known in the art. The microprocessor 430 is also coupled via a serial interface 440 to a preamplifier 444. The preamplifier 444 contains a bridge circuit 100 of FIG. 1, including the programmable circuit 200 depicted in FIG. 2 for each of the write heads in the drive 400, as well as other circuitry 434, known in the art. The preamplifier 444 is coupled to each write head 412 by a communication path 448.

When the drive 400 is manufactured, the drive is tested to see which configuration, (FIG. 2C) of the programmable circuit 200 provides the optimum results for proper data transfer. This configuration is then stored into the ROM of the microprocessor 430. When the drive 400 is initialized, the codes stored in the ROM memory of the microprocessor 430 are sent along the serial bus 444 to the preamplifier 444, enabling the proper NOR gates of the programmable circuit 200. Once enabled, the heads 412 of the drive 400 operate at their optimum levels as data is written to the drive.

Although various specific examples have been used herein to describe embodiments of the invention, it is well recognized that equivalent substitutions can be made for some of the components used. Also, in the sake of brevity, a description of operation of well known devices has been omitted. The scope of the invention is determined solely by the scope of the claims.

What is claimed is:

1. An H-bridge circuit comprising:
   an inductive element coupled between a first and a second node;
   a first driving transistor having a first terminal coupled to a voltage source and having a second terminal coupled to the first node, the first driving transistor driven by a first driver circuit;
   a second driving transistor having a first terminal coupled to the voltage source and having a second terminal coupled to the second node, the second driving transistor driven by a second driver circuit:
   a third driving transistor having a first terminal coupled to the first node and having a second terminal coupled to a reference voltage, the third driving transistor driven by a third driver circuit;
   a fourth driving transistor having a first terminal coupled to the second node and having a second terminal coupled to the reference voltage, the fourth driving transistor driven by a fourth driver circuit; and
   a programmable voltage pull-up circuit coupled to one of the driver circuits, wherein the programmable voltage pull-up circuit comprises:
   a plurality of logic gates, each logic gate being independently selectable;
   a plurality of capacitors, each capacitor being coupled to an output of a respective one of the logic gates; and
   a circuit output coupled to the plurality of capacitors.

2. The circuit of claim 1 wherein each of the logic gates is selectable responsive to a programming signal received by the programmable pull-up circuit.

3. The circuit of claim 1 wherein the capacitance value of the capacitors relate to each other in a binary weighting.

4. The circuit of claim 1 wherein the logic gates comprise NOR gates.

5. The circuit of claim 4 wherein each of the NOR gates is coupled to an inverter, the output of which is coupled to a respective one of the capacitors.

6. The circuit of claim 1 wherein codes used to create the programming signals are stored in a ROM memory.

7. The circuit of claim 1 wherein the logic gates are selected by receiving an enabling signal and wherein the capacitors coupled to the enabled logic gates are structured to couple the circuit output to a pull-up voltage upon receiving a data signal.

8. A disk drive comprising:
   ROM memory for storing data used to produce programming signals;
   a microprocessor for receiving signals from a bus;
   a preamplifier coupled to the microprocessor; and
   an H-bridge circuit coupled to the preamplifier, the H-bridge circuit including:
   a write head,
   a first pair of driving transistors having drains coupled together and coupled to a voltage source, the write head coupled between the sources of the first pair of transistors and each of the first pair of driving transistor being driven by a respective first driver circuit,
   a second pair of driving transistors having sources coupled together and coupled to a reference voltage, the write head coupled between the drains of the second pair of transistors and each of the second pair of driving transistor being driven by a respective second driver circuit, and
   a programmable voltage boost circuit comprised in each of the second driver circuits.

9. The circuit of claim 8 wherein microprocessor comprises the ROM memory.

10. The circuit of claim 8 wherein the programmable voltage boost circuit comprises:
    a plurality of logic gates, each logic gate independently enabled;
    a plurality of capacitors, each capacitor coupled to an output of a respective one of the logic gates; and
    a circuit output coupled to the plurality of capacitors.

11. The circuit of claim 10 wherein each of the logic gates is enabled or not enabled responsive to the programming signals received by the programmable voltage boost circuit.

12. The circuit of claim 10 wherein the capacitance value of the capacitors relate to each other by a power of 2.

13. The circuit of claim 10 wherein the logic gates comprise NOR gates.

14. The circuit of claim 13 wherein each of the NOR gates is coupled to an inverter, the output of which is coupled to a respective one of the capacitors.

15. The circuit of claim 10 wherein the logic gates are enabled by receiving a selection signal and wherein the voltage boost circuit is structured to, when the logic gates are enabled, capacitively couple the circuit output to a pull-up voltage upon receiving a data signal of a first type.

16. A method of providing a pull-up voltage to a circuit that drives a transistor in an H-bridge circuit, the method comprising:
    providing enabling signals to a voltage pull-up circuit that also accepts a data signal and has an output;
    using the enabling signals to selectively enable one or more logic gates within the voltage boost circuit; and
    capacitively couple the output of the voltage boost circuit to a pull-up voltage when a valid data signal is received by an enabled logic gate.

17. The method of claim 16 wherein each of the logic gates are coupled to a capacitor with a different capacitance value of any other capacitor in the voltage boost circuit.

18. The method of claim 17 wherein the capacitance values of the capacitors are related to one another by a power of two.

19. A method of programming a voltage boost circuit comprising:
    determining an optimum boost level for the H-bridge transistor driving circuit;

selecting a combination of pull-up circuits for boost capacitors that provide a desired level of voltage boost;

devising codes that will enable the desired pull-up circuits within the voltage boost circuit; and storing the enabling codes into a non-volatile memory that is accessed by circuitry structured to convert the codes into signals and pass the signals to the voltage boost circuit.

20. The method of claim 19 wherein the enabling codes are stored in ROM memory.

21. The method of claim 19 wherein each of the pull-up circuits comprises a logic gate coupled to a capacitor.

22. The method of claim 19 wherein the logic gates are NOR gates.

23. The method of claim 19 wherein the capacitance values of the capacitors in the voltage boost circuit are related to each other by a power of 2.

* * * * *